United States Patent
Yamamoto et al.

(10) Patent No.: US 11,489,174 B2
(45) Date of Patent: Nov. 1, 2022

(54) FUEL BATTERY CELL, FUEL BATTERY, AND METHOD OF MANUFACTURING FUEL BATTERY CELL

(71) Applicant: Panasonic Intellectual Property Management Co., Ltd., Osaka (JP)

(72) Inventors: Yoko Yamamoto, Osaka (JP); Tsutomu Kawashima, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/235,095

(22) Filed: Apr. 20, 2021

(65) Prior Publication Data
US 2021/0359313 A1 Nov. 18, 2021

(30) Foreign Application Priority Data
May 14, 2020 (JP) .............................. JP2020-085339

(51) Int. Cl.
*H01M 8/0258* (2016.01)
*H01M 4/88* (2006.01)
*H01M 8/0221* (2016.01)

(52) U.S. Cl.
CPC ....... *H01M 8/0258* (2013.01); *H01M 4/8807* (2013.01); *H01M 8/0221* (2013.01)

(58) Field of Classification Search
CPC .................................................. H01M 8/0258
See application file for complete search history.

(56) References Cited

U.S. PATENT DOCUMENTS

| | | | |
|---|---|---|---|
| 2005/0197246 A1 | 9/2005 | Yoshida et al. | |
| 2010/0086819 A1 | 4/2010 | Gemba et al. | |
| 2011/0003232 A1 | 1/2011 | Obika | |
| 2013/0108942 A1 | 5/2013 | Sugiura et al. | |
| 2019/0006696 A1* | 1/2019 | Yoshimoto | H01M 4/8807 |

FOREIGN PATENT DOCUMENTS

| | | |
|---|---|---|
| JP | 2000-251913 | 9/2000 |
| JP | 2007-242444 | 9/2007 |
| JP | 2009-211813 | 9/2009 |
| JP | 4469415 B | 5/2010 |
| JP | 4824298 B | 11/2011 |
| JP | 2012-069341 | 4/2012 |
| JP | 2013-098044 | 5/2013 |

* cited by examiner

*Primary Examiner* — Brian R Ohara
(74) *Attorney, Agent, or Firm* — Wenderoth, Lind & Ponack, L.L.P.

(57) ABSTRACT

A fuel battery cell includes: a first separator, a first gas diffusion layer, a first catalyst layer, a polymer electrolyte membrane, a second catalyst layer, a second gas diffusion layer, and a second separator that are sequentially laminated along a laminating direction; a first gas flow path part that is provided between the first separator and the first gas diffusion layer; and a second gas flow path part that is provided between the first separator and the first gas diffusion layer and adjacent to the first gas flow path part in a direction intersecting the laminating direction, and has a flow path area larger than that of the first gas flow path part in a plan view seen along the laminating direction. The first gas diffusion layer includes a first low-elasticity part facing the first gas flow path part, and a first high-elasticity part facing the second gas flow path part and having a higher compressive modulus of elasticity than that of the first low-elasticity part in the laminating direction.

10 Claims, 7 Drawing Sheets

| | | Compressive modulus of elasticity | Thickness | Porosity | Contact angle | Gurley number |
|---|---|---|---|---|---|---|
| | | N/mm2 | μm | % | ° | sec/100ml |
| Example 1 | Low-elasticity part 5' | 2.9 | 208 | 70.0 | 155 | 110 |
| | High-elasticity part 6' | 3.5 | 206 | 65.4 | 153 | 125 |
| Example 2 | Low-elasticity part 5' | 3.3 | 280 | 69.7 | 153 | 73 |
| | High-elasticity part 6' | 5.5 | 477 | 66.0 | 155 | 148 |
| Example 3 | Low-elasticity part 5' | 2.7 | 284 | 70.9 | 155 | 76 |
| | High-elasticity part 6' | 4.3 | 243 | 67.4 | 155 | 95 |
| Comparative example 1 | | 2.8 | 181 | 71.0 | 153 | 78 |

FUEL BATTERY CELL, FUEL BATTERY, AND METHOD OF MANUFACTURING FUEL BATTERY CELL

BACKGROUND

1. Technical Field

The present disclosure relates to a fuel battery cell, a fuel battery, and a method of manufacturing the fuel battery cell.

2. Description of the Related Art

A polymer electrolyte fuel battery is used as an example of a fuel battery. In a polymer electrolyte fuel battery, one side of a hydrogen ion conductive polymer electrolyte membrane is exposed to a fuel gas such as hydrogen, and the other side is exposed to oxygen, and water is thus synthesized by a chemical reaction via the electrolyte membrane. As a result, reaction energy generated when synthesizing is electrically extracted.

A single cell of the polymer electrolyte fuel battery has a membrane electrode assembly (hereinafter referred to as MEA) and a pair of conductive separators disposed on both sides of the MEA.

The MEA includes a hydrogen ion conductive polymer electrolyte membrane and a pair of electrode layers with the electrolyte membrane interposed therebetween. The pair of electrode layers have a catalyst layer formed on both sides of the polymer electrolyte membrane and containing carbon powders supporting a platinum group catalyst as a main component, and a gas diffusion layer formed on the catalyst layer and having a collecting action together with gas permeability and water repellency.

Since the gas diffusion layer serves to uniformly supply gas supplied from the separator to the catalyst layer, it is necessary to have good gas permeability and gas diffusibility. In addition, the gas diffusion layer needs to have good conductivity as a conductive path for electrons between the catalyst layer and the separator. A gas flow path having a predetermined pattern is formed on the surface of the separator in contact with the gas diffusion layer in order to remove the supply gas or excess moisture.

Japanese Patent No. 4824298 discloses a method of manufacturing a gas diffusion layer for a fuel battery. In Japanese Patent No. 4824298, when the gas diffusion layer is produced using carbon cloth or carbon felt with high flexibility and insufficient hardness due to an increase in hardness of the gas diffusion layer, a problem that the gas diffusion layer sags into the gas flow path in the separator, and variations of pressure loss is thus increased in the gas flow path and flooding easily occurs is solved.

Japanese Patent Unexamined Publication No. 2007-242444 discloses a gas diffusion layer for a fuel battery containing a fluororesin and carbon particles and having a compressive modulus of elasticity in a thickness direction of a gas diffusion layer of 15 N/mm$^2$ or more. According to the gas diffusion layer for a fuel battery of Japanese Patent Unexamined Publication No. 2007-242444, it is possible to suppress the gas diffusion layer from being deformed due to irregularities of a surface of a separator even when a large pressure is applied to the thickness direction.

Japanese Patent No. 4469415 presents a separator in which shapes of a flow path and a rib are changed in an electrode.

SUMMARY

According to an aspect of the present disclosure, a fuel battery cell includes: a first separator, a first gas diffusion layer, a first catalyst layer, a polymer electrolyte membrane, a second catalyst layer, a second gas diffusion layer, and a second separator that are sequentially laminated along a laminating direction; a first gas flow path part that is provided between the first separator and the first gas diffusion layer; and a second gas flow path part that is provided between the first separator and the first gas diffusion layer and adjacent to the first gas flow path part in a direction intersecting the laminating direction, the second gas flow path part including a flow path area larger than a flow path area of the first gas flow path part in a plan view seen along the laminating direction. The first gas diffusion layer includes a first low-elasticity part facing the first gas flow path part, and a first high-elasticity part facing the second gas flow path part and having a higher compressive modulus of elasticity than a compressive modulus of elasticity of the first low-elasticity part in the laminating direction.

DETAILED DESCRIPTIONS

As described above, Japanese Patent No. 4824298 and Japanese Patent Unexamined Publication No. 2007-242444 disclose a gas diffusion layer for a fuel battery. Japanese Patent No. 4469415 presents a separator in which shapes of a flow path and a rib are changed in an electrode.

As in Japanese Patent No. 4469415, an area of the flow path in a plan view seen along the thickness direction of the gas diffusion layer (hereinafter simply referred to as "plan view") may be partially smaller than that of a rib inside or outside the electrode surface in a plan view, depending on the shape of the separator. When the gas diffusion layers of Japanese Patent No. 4824298 and Japanese Patent Unexamined Publication No. 2007-242444 are applied to the separator having such a shape, the deformation of the gas diffusion layers cannot be sufficiently suppressed in a region in which the area of the rib is smaller than that of the gas flow path in a plan view due to a space between the gas diffusion layer and the separator, and discharge performance of water in the gas diffusion layer cannot be sufficiently improved. Further, the pressure loss of the separator cannot be sufficiently reduced due to the deformation of the gas diffusion layer in the region in which the area of the rib is smaller than that of the gas flow path in a plan view. That is, it is difficult to obtain a fuel battery cell capable of enhancing the discharge performance of water in the gas diffusion layer and reducing the pressure loss by preventing the deformation of the gas diffusion layer.

An object of the present disclosure is to provide a fuel battery cell capable of suppressing deformation of a gas diffusion layer, a fuel battery having the fuel battery cell, and a method of manufacturing the fuel battery cell.

According to an aspect of the present disclosure, a fuel battery cell includes: a first separator, a first gas diffusion layer, a first catalyst layer, a polymer electrolyte membrane, a second catalyst layer, a second gas diffusion layer, and a second separator that are sequentially laminated along a laminating direction; a first gas flow path part that is provided between the first separator and the first gas diffusion layer; and a second gas flow path part that is provided between the first separator and the first gas diffusion layer and adjacent to the first gas flow path part in a direction intersecting the laminating direction, and has a flow path area larger than that of the first gas flow path part in a plan view seen along the laminating direction. The first gas diffusion layer includes a first low-elasticity part facing the first gas flow path part, and a first high-elasticity part facing the second gas flow path part and having a higher compressive modulus of elasticity than that of the first low-elasticity part in the laminating direction.

According to an aspect of the present disclosure, the fuel battery includes the fuel battery cells, and a pair of current collecting plates disposed on both sides of the fuel battery cell in the laminating direction, respectively.

A first method of manufacturing the fuel battery cell according to an aspect of the present disclosure is a method of manufacturing the fuel battery cell, and includes the following: rolling a kneaded product prepared by kneading a raw material of the first low-elasticity part to form a first rolled sheet having a shape corresponding to that of the first low-elasticity part; rolling a kneaded product prepared by kneading a raw material of the first high-elasticity part to form a second rolled sheet having a shape corresponding to that of the first high-elasticity part; and disposing the first rolled sheet to face the first gas flow path part, and disposing the second rolled sheet to face the second gas flow path part, and then rolling the first rolled sheet and the second rolled sheet to form the first gas diffusion layer.

A second method of manufacturing the fuel battery cell according to an aspect of the present disclosure is a method of manufacturing the fuel battery cell, and includes the following: rolling a first kneaded product prepared by kneading a raw material to form a first rolled sheet having a shape corresponding to that of the first gas diffusion layer; rolling a second kneaded product prepared by kneading the raw material to form a second rolled sheet having a shape corresponding to that of the first high-elasticity part; and laminating and rolling the first rolled sheet and the second rolled sheet to form the first gas diffusion layer.

A third method of manufacturing the fuel battery cell according to an aspect of the present disclosure is a method of manufacturing the fuel battery cell, and includes the following: rolling a kneaded product prepared by kneading a raw material of the first low-elasticity part to form a first rolled sheet having a shape corresponding to that of the first low-elasticity part; rolling a kneaded product prepared by kneading a raw material of the first high-elasticity part to form a second rolled sheet having a shape corresponding to that of the first high-elasticity part; and disposing the first rolled sheet at a position corresponding to that of the first gas flow path part, and disposing the second rolled sheet at a position corresponding to that of the second gas flow path part, and then laminating a resin sheet having a shape corresponding to that of the first high-elasticity part on the second rolled sheet, and rolling the first rolled sheet, the second rolled sheet, and the resin sheet, to form the first gas diffusion layer.

According to the present disclosure, it is possible to obtain a fuel battery cell capable of suppressing deformation of the gas diffusion layer.

Hereinafter, exemplary embodiments of the present disclosure will be described with reference to the drawings. In the drawings, similar components are denoted by the same reference numerals, and description thereof will be omitted as appropriate. Further, the exemplary embodiments are not limited to the present disclosure, but can be appropriately modified without departing from the gist of the present disclosure by way of example.

Fuel Battery

Figure 1:
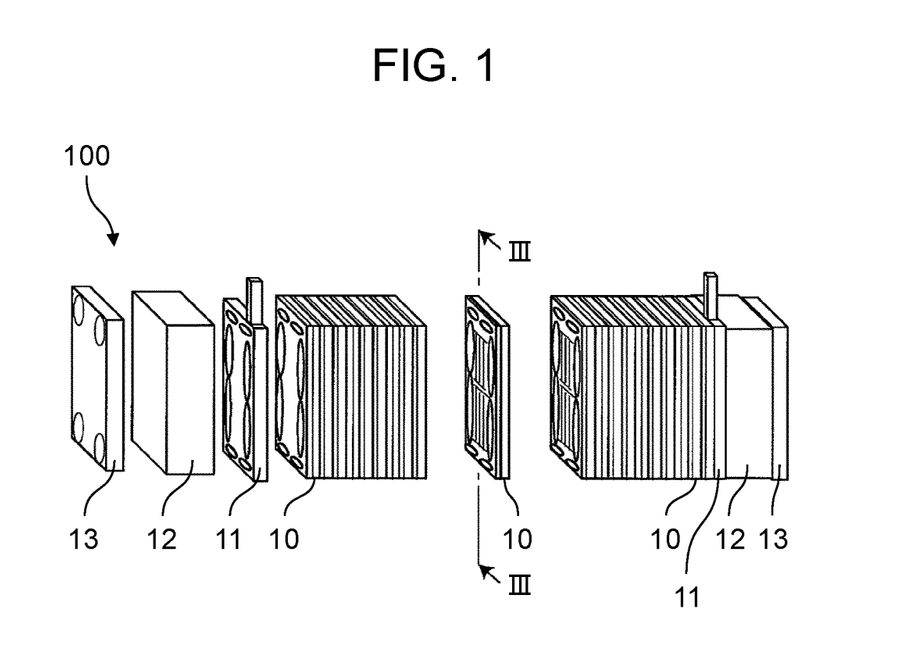
FIG. 1 is a schematic exploded perspective view of a fuel battery including fuel battery cells according to a first exemplary embodiment of the present disclosure.

As shown in FIG. 1, fuel battery 100 according to an exemplary embodiment of the present disclosure includes fuel battery cell 10 and current collecting plates 11. In the present exemplary embodiment, fuel battery 100 includes, for example, a plurality of fuel battery cells 10 laminated in a thickness direction of fuel battery 100. Current collecting plates 11 are disposed on both sides of laminated fuel battery cells 10 in the laminating direction of fuel battery cell 10, respectively. Insulating plates 12 and end plates 13 are disposed on the both sides of current collecting plate 11 in the laminating direction of fuel battery cell 10, respectively. In fuel battery 100 of FIG. 1, fuel battery cells 10, current collecting plates 11, insulating plates 12, and end plates 13 are fastened together in a state where fuel battery cells 10 are compressed by current collecting plates 11, insulating plates 12, and end plates 13 with a predetermined load. The number of fuel battery cells 10 may be one. Further, when the plurality of fuel battery cells 10 are laminated, a gasket (not shown) may be provided between adjacent fuel battery cells 10.

Current collecting plate 11 is formed of a conductive material with gas impermeability such as copper or brass. Current collecting plate 11 is provided with a current extraction terminal portion (not shown), and a current is extracted from the current extraction terminal portion during power generation.

Insulating plate 12 is formed of an insulating material such as a fluorine resin or a PPS resin. Insulating plate 12 may be provided with an inlet and an outlet (not shown) for gas or cooling water.

End plate 13 is formed of a metal material having high rigidity such as steel. Fuel battery cells 10, current collecting plates 11, and insulating plates 12 are fastened and held by a pressurizing unit (not shown) via end plates 13 with a predetermined load.

Fuel Battery Cell

First Exemplary Embodiment

Figure 2:
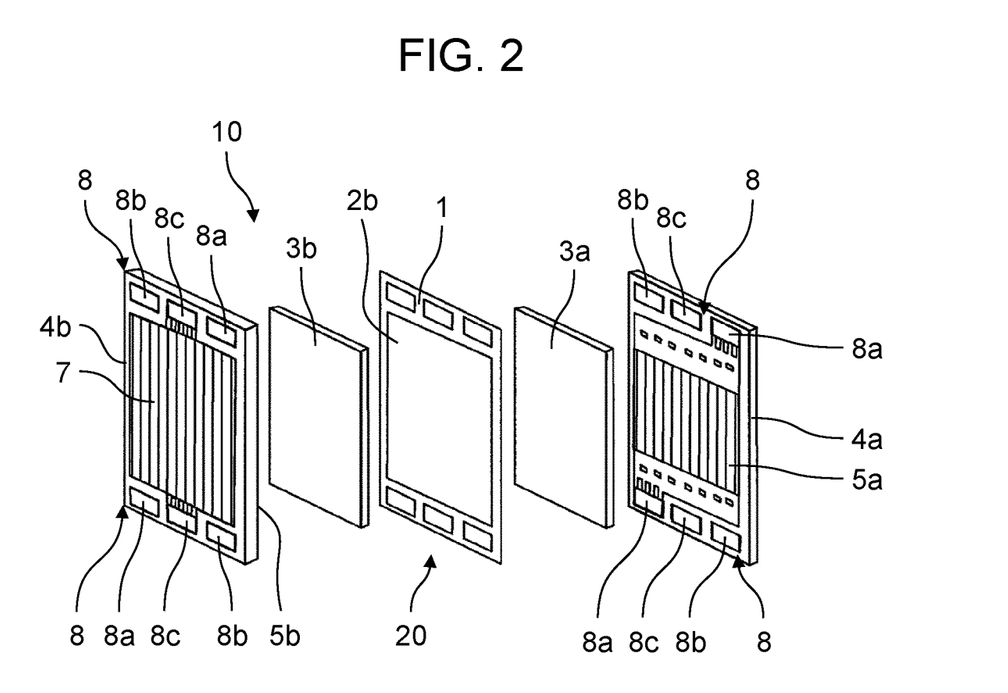
FIG. 2 is an exploded perspective view of the fuel battery cell in FIG. 1.
Figure 3:
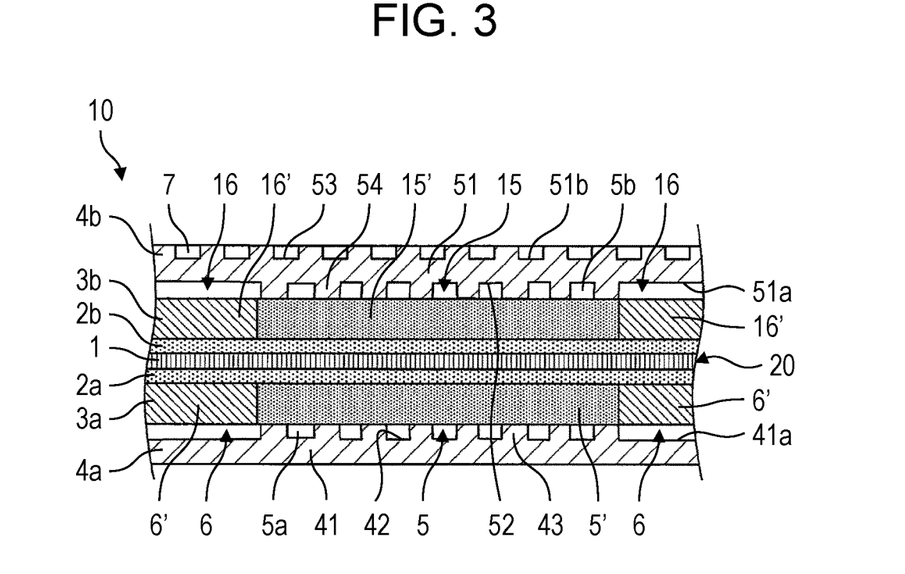
FIG. 3 is a partial cross-sectional view of the fuel battery cell taken along line III-III in FIG. 1.

FIG. 2 is an exploded perspective view of fuel battery cell 10. FIG. 3 is a cross-sectional view taken along line III-III in FIG. 1.

As shown in FIG. 2, fuel battery cell 10 includes membrane electrode assembly (hereinafter referred to as MEA)

20 and a pair of separators (hereinafter, each referred to as anode-side separator 4a and cathode-side separator 4b) with MEA 20 interposed therebetween from the both sides of MEA 20 in a thickness direction of fuel battery cell 10. MEA 20 includes polymer electrolyte membrane 1, catalyst layers 2a and 2b (hereinafter each referred to as anode catalyst layer 2a and cathode catalyst layer 2b) disposed on both sides of polymer electrolyte membrane 1 in the thickness direction of fuel battery cell 10, respectively, and gas diffusion layers 3a and 3b (hereinafter each referred to as anode-side gas diffusion layer 3a and cathode-side gas diffusion layer 3b). That is, fuel battery cell 10 has a structure in which anode-side separator 4a as an example of the first separator, anode-side gas diffusion layer 3a as an example of the first gas diffusion layer, anode catalyst layer 2a as an example of the first catalyst layer, polymer electrolyte membrane 1, cathode catalyst layer 2b as an example of the second catalyst layer, cathode-side gas diffusion layer 3b as an example of the second gas diffusion layer, and cathode-side separator 4b as an example of the second separator are laminated sequentially. Cathode-side separator 4b may be used as the first separator, cathode-side gas diffusion layer 3b may be used as the first gas diffusion layer, cathode catalyst layer 2b may be used as the first catalyst layer, anode catalyst layer 2a may be used as the second catalyst layer, anode-side gas diffusion layer 3a may be used as the second gas diffusion layer, and anode-side separator 4a may be used as the second separator.

A junction pair of anode catalyst layer 2a, polymer electrolyte membrane 1, and cathode catalyst layer 2b are called a catalyst coated membrane (CCM, hereinafter referred to as CCM). Polymer electrolyte membrane 1 has the same surface area as anode catalyst layer 2a and cathode catalyst layer 2b, or the larger surface area than anode catalyst layer 2a and cathode catalyst layer 2b.

As shown in FIGS. 2 and 3, anode-side separator 4a has plate-shaped separator main body 41, for example. A plurality of first grooves 42 forming anode gas flow path 5a and gas supply holes 8 disposed in such a manner that the plurality of first grooves 42 are interposed therebetween are provided on surface 41a of separator main body 41 facing anode-side gas diffusion layer 3a. Each gas supply hole 8 penetrates anode-side separator 4a in the thickness direction thereof. In addition, cathode-side separator 4b has plate-shaped separator main body 51, for example. A plurality of second grooves 52 forming cathode gas flow path 5b and gas supply holes 8 disposed in such a manner that the plurality of second grooves 52 are interposed therebetween are provided on surface 51a of separator main body 51 facing cathode-side gas diffusion layer 3b. Each gas supply hole 8 penetrates cathode-side separator 4b in the thickness direction thereof. A plurality of third grooves 53 forming a cooling medium flow path are provided on surface 51b of separator main body 51 on a side opposite to surface 51a in the thickness direction of separator main body 51. In the present exemplary embodiment, anode gas flow path 5a is composed of first gas flow path part 5 and second gas flow path part 6 disposed between first gas flow path part 5 and gas supply hole 8. In addition, cathode gas flow path 5b is composed of third gas flow path part 15 and fourth gas flow path part 16 disposed between third gas flow path part 15 and gas supply hole 8.

Each of first gas flow path part 5 and second gas flow path part 6 has a flow path area in a plan view seen along the laminating direction of MEA 20. The flow path area of second gas flow path part 6 is larger than that of first gas flow path part 5.

Each of third gas flow path part 15 and fourth gas flow path part 16 has a flow path area in a plan view seen along the laminating direction of MEA 20. The flow path area of fourth gas flow path part 16 is larger than that of third gas flow path part 15.

For example, the flow path area is the product of a length of the groove, a width of the groove, and the number of grooves.

As shown in FIG. 2, gas supply hole 8 includes anode gas supply hole 8a, cathode gas supply hole 8b, and cooling medium gas supply hole 8c, for example. Gas supply hole 8 of anode-side separator 4a and gas supply hole 8 of cathode-side separator 4b are connected to each other when fuel battery cells 10 are laminated, and continuously extend in the laminating direction of fuel battery cell 10. Anode gas supply hole 8a is connected to anode gas flow path 5a, supplies hydrogen-containing fuel gas from a supply pipe (not shown) connected to the outside of a fuel battery stack to anode gas flow path 5a, and discharges anode gas from anode gas flow path 5a. Cathode gas supply hole 8b is connected to cathode gas flow path 5b, supplies air-containing oxidant gas from the supply pipe to cathode gas flow path 5b, and discharges the oxidant gas from cathode gas flow path 5b. Cooling medium gas supply hole 8c is connected to cooling medium flow path 7, supplies a cooling medium from the supply pipe to cooling medium flow path 7, and discharges the cooling medium from cooling medium flow path 7.

Anode-side gas diffusion layer 3a includes first low-elasticity part 5' facing first gas flow path part 5 of anode-side separator 4a, and first high-elasticity part 6' facing second gas flow path part 6 of anode-side separator 4a and having a higher compressive modulus of elasticity than first low-elasticity part 5' in the thickness direction. Cathode-side gas diffusion layer 3b includes second low-elasticity part 15' facing third gas flow path part 15 of cathode-side separator 4b, and second high-elasticity part 16' facing fourth gas flow path part 16 of cathode-side separator 4b and having a higher compressive modulus of elasticity than second low-elasticity part 15' in the thickness direction.

Since anode-side gas diffusion layer 3a and cathode-side gas diffusion layer 3b have high-elasticity parts 6' and 16', respectively, deformation and expansion of anode-side gas diffusion layer 3a and cathode-side gas diffusion layer 3b can be suppressed. As a result, a space of second gas flow path part 6 between anode-side separator 4a and anode-side gas diffusion layer 3a and a space of fourth gas flow path part 16 between cathode-side separator 4b and cathode-side gas diffusion layer 3b can be sufficiently secured, thereby improving discharge performance of water in fuel battery cell 10 and reducing pressure loss. Therefore, fuel battery cell 10 can have excellent power generation performance.

For example, as shown in FIG. 2, second gas flow path part 6 is disposed between gas supply hole 8 and first gas flow path part 5 and fourth gas flow path part 16 is disposed between gas supply hole 8 and third gas flow path part 15, so that second gas flow path part 6 and fourth gas flow path part 16 function as a rectifying part that rectifies flow of fluids flowing into the gas flow path parts. Further, second gas flow path part 6 and fourth gas flow path part 16 may be provided in either an in-plane or out-of-plane of the electrode constituting the gas diffusion layer and the catalyst layer.

Second Exemplary Embodiment

Figure 4:
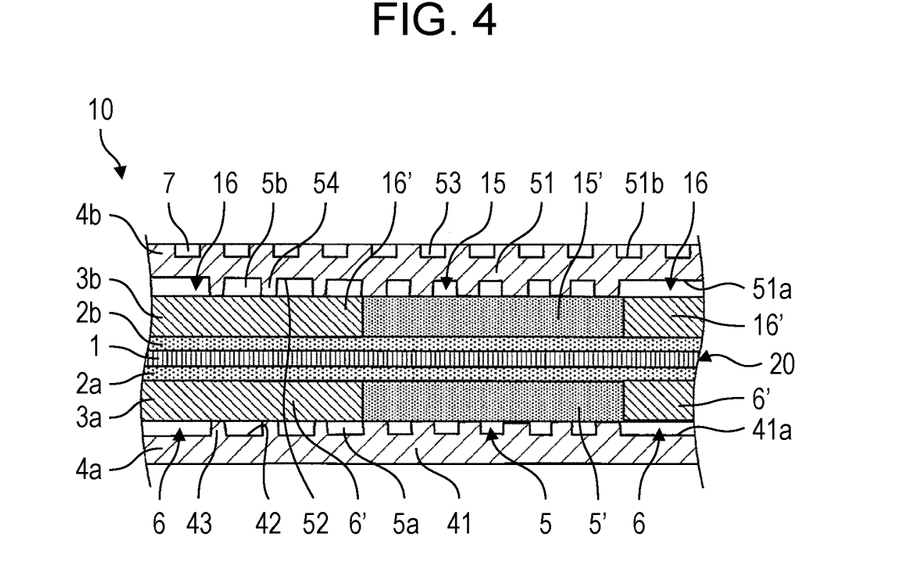
FIG. 4 is a cross-sectional view of the fuel battery cell according to a second exemplary embodiment of the present disclosure, taken along line III-III in FIG. 1.

FIG. 4 is a cross-sectional view of fuel battery cell 10 according to a second exemplary embodiment of the present disclosure, taken along line III-III in FIG. 1. In fuel battery cell 10 of the second exemplary embodiment, second gas flow path part 6 disposed upstream of first gas flow path part 5 and fourth gas flow path part 16 disposed upstream of third gas flow path part 15 have different flow path areas, and second gas flow path part 6 disposed downstream of first gas flow path part 5 and fourth gas flow path part 16 disposed downstream of third gas flow path part 15 have different flow path areas, in a plan view seen along the laminating direction of MEA 20. In the second exemplary embodiment, the same components as those in the first exemplary embodiment are denoted by the same reference numerals, and the description thereof will be omitted.

As shown in FIG. 4, in fuel battery cell 10 of the second exemplary embodiment, the flow path area becomes larger in the order of first gas flow path part 5, second gas flow path part 6 disposed upstream of first gas flow path part 5, and second gas flow path part 6 disposed downstream of first gas flow path part 5, in a plan view seen along the laminating direction of MEA 20.

Further, in fuel battery cell 10 of the second exemplary embodiment, the flow path area becomes larger in the order of third gas flow path part 15, fourth gas flow path part 16 disposed upstream of third gas flow path part 15, and fourth gas flow path part 16 disposed downstream of third gas flow path part 15, in a plan view seen along the laminating direction of MEA 20.

In the two exemplary embodiments described above, high-elasticity parts 6' and 16' are formed on both anode-side gas diffusion layer 3a and cathode-side gas diffusion layer 3b, but high-elasticity parts 6' and 16' may be provided on at least one of anode-side gas diffusion layer 3a and cathode-side gas diffusion layer 3b. Even in this case, power generation performance of fuel battery cell 10 can be improved. However, from the viewpoint of implementing fuel battery cell 10 having higher power generation performance, it is preferable that high-elasticity parts 6' and 16' are formed on both of anode-side gas diffusion layer 3a and cathode-side gas diffusion layer 3b.

A material having proton conductivity capable of selectively transporting hydrogen ions, for example, a perfluorocarbon sulfonic acid polymer can be used for polymer electrolyte membrane 1.

A layer containing a carbon material supporting catalyst particles such as platinum and a polymer electrolyte can be used for each of anode catalyst layer 2a and cathode catalyst layer 2b.

For each of anode-side gas diffusion layer 3a and cathode-side gas diffusion layer 3b, a sheet containing carbon as a main component and having high gas permeability can be used.

A carbon material or a metal material can be used for each of anode-side separator 4a and cathode-side separator 4b.

In fuel battery cells 10 of the first exemplary embodiment and the second exemplary embodiment, cooling medium flow path 7 is formed only in cathode-side separator 4b, but it is preferable that cooling medium flow path is also formed in anode-side separator 4a.

Each of second gas flow path part 6 and fourth gas flow path part 16 is provided so that the fuel gas is uniformly distributed from the gas supply hole to first gas flow path part 5 and the oxidant gas is uniformly distributed to third gas flow path part 15. Each of first rib 43 between adjacent first grooves 42 and second rib 54 between adjacent second grooves 52 can be formed in any shape such as a line shape or an island shape. An area in which first rib 43 of second gas flow path part 6 is in contact with anode-side gas diffusion layer 3a is smaller than an area in which first rib 43 of first gas flow path part 5 is in contact with anode-side gas diffusion layer 3a. In addition, an area in which second rib 54 of fourth gas flow path part 16 is in contact with cathode-side gas diffusion layer 3b is smaller than an area in which second rib 54 of third gas flow path part 15 is in contact with cathode-side gas diffusion layer 3b. That is, anode-side gas diffusion layer 3a is formed so that an area of a surface facing anode-side separator 4a has the same area as a surface area of surface 41a of anode-side separator 4a and first groove 42 constituting first gas flow path part 5 or as a surface area of surface 41a of anode-side separator 4a and first groove 42 constituting first gas flow path part 5 and second gas flow path part 6, and alternatively, an area of a surface facing anode-side separator 4a has an area larger than the surface area of surface 41a of anode-side separator 4a and first groove 42 constituting first gas flow path part 5 or as a surface area of surface 41a of anode-side separator 4a and first groove 42 constituting first gas flow path part 5 and second gas flow path part 6. Similarly, cathode-side gas diffusion layer 3b is formed so that an area of a surface facing cathode-side separator 4b has the same area as a surface area of surface 51a of cathode-side separator 4b and second groove 52 constituting third gas flow path part 15 or as a surface area of surface 51a of cathode-side separator 4b and second groove 52 constituting third gas flow path part 15 and fourth gas flow path part 16, and alternatively, an area of a surface facing cathode-side separator 4b has an area larger than the surface area of surface 51a of cathode-side separator 4b and second groove 52 constituting third gas flow path part 15 or as the surface area of surface 51a of cathode-side separator 4b and second groove 52 constituting third gas flow path part 15 and fourth gas flow path part 16.

In anode-side gas diffusion layer 3a and cathode-side gas diffusion layer 3b, a compressive modulus of elasticity of high-elasticity parts 6' and 16' is preferably 3.0 N/mm$^2$ or more. When the compressive modulus of elasticity of high-elasticity part 6' of anode-side gas diffusion layer 3a and high-elasticity part 16' of cathode-side gas diffusion layer 3b is 3.0 N/mm$^2$ or more, high-elasticity part 6' of anode-side gas diffusion layer 3a and high-elasticity part 16' of cathode-side gas diffusion layer 3b are less likely to be deformed or second gas flow path part 6 and fourth gas flow path part 16 are less likely to be closed. Therefore, water clogging is less likely to occur in second gas flow path part 6 and fourth gas flow path part 16. Further, since second gas flow path part 6 and fourth gas flow path part 16 are less likely to be closed, pressure loss of the second gas flow path part 6 and the fourth gas flow path part 16 can be further reduced.

In anode-side gas diffusion layer 3a and cathode-side gas diffusion layer 3b, a porosity of low-elasticity parts 5' and 15' is preferably 65% or more and 75% or less. When the porosity of low-elasticity parts 5' and 15' is 65% or more, gas diffusivity can be enhanced to sufficiently secure a discharge path of water. Therefore, flooding is less likely to occur and battery performance of fuel battery cell 10 can be further improved. In addition, when the porosity of low-elasticity parts 5' and 15' is 75% or less, good conductivity and water retentivity can be implemented and the battery performance of fuel battery cell 10 can be further improved.

In anode-side gas diffusion layer 3a and cathode-side gas diffusion layer 3b, a porosity of high-elasticity parts 6' and 16' is preferably 65% or more and 70% or less. When the porosity of high-elasticity parts 6' and 16' is 65% or more, deformation of high-elasticity parts 6' and 16' can be suppressed while securing good gas diffusivity and a sufficient discharge path of water. Therefore, the battery performance of fuel battery cell 10 can be improved. In addition, when the porosity of high-elasticity parts 6' and 16' is 70% or less, the high-elasticity parts 6' and 16' have good conductivity and water retentivity. Therefore, the battery performance of fuel battery cell 10 can be further improved.

The porosity of each of anode-side gas diffusion layer 3a and cathode-side gas diffusion layer 3b can be measured by the following method. First, apparent true densities of anode-side gas diffusion layer 3a and cathode-side gas diffusion layer 3b are calculated based on a true density and a composition ratio of each material of anode-side gas diffusion layer 3a and cathode-side gas diffusion layer 3b. Subsequently, a weight, a thickness, and a longitudinal/lateral dimension of the manufactured anode-side gas diffusion layer 3a and cathode-side gas diffusion layer 3b are measured to calculate a density of manufactured anode-side gas diffusion layer 3a and cathode-side gas diffusion layer 3b. Subsequently, the porosity of each of anode-side gas diffusion layer 3a and cathode-side gas diffusion layer 3b is calculated based on an equation of porosity=(density of anode-side gas diffusion layer 3a or cathode-side gas diffusion layer 3b)/(apparent true density)×100.

A contact angle of each of anode-side gas diffusion layer 3a and cathode-side gas diffusion layer 3b with respect to water is preferably 150 degrees or more. That is, a water contact angle with surfaces of low-elasticity part 5' and high-elasticity part 6' of anode-side gas diffusion layer 3a and a water contact angle with surfaces of low-elasticity part 15' and high-elasticity part 16' of cathode-side gas diffusion layer 3b are preferably 150 degrees or more. When the contact angle of anode-side gas diffusion layer 3a and cathode-side gas diffusion layer 3b is 150 degrees or more, the surfaces of anode-side gas diffusion layer 3a and cathode-side gas diffusion layer 3b have excellent water repellency, and water is less likely to stay in the surfaces of anode-side gas diffusion layer 3a and cathode-side gas diffusion layer 3b. Therefore, gas permeability of anode-side gas diffusion layer 3a and cathode-side gas diffusion layer 3b is further improved.

Each of anode-side gas diffusion layer 3a and cathode-side gas diffusion layer 3b preferably has a Gurley number of 50 sec/100 mL or more and 150 sec/100 mL or less. That is, both of low-elasticity part 5' and high-elasticity part 6' of anode-side gas diffusion layer 3a and low-elasticity part 15' and high-elasticity part 16' of cathode-side gas diffusion layer 3b preferably have Gurley numbers of 50 sec/100 mL or more and 150 sec/100 mL or less. The reason is as follows. When the Gurley numbers of low-elasticity parts 5' and 15' and high-elasticity parts 6' and 16' are 50 sec/100 mL or more, the water retentivity is less likely to decrease especially during low humidification, and an increase in proton resistance can be prevented. Thus, the battery performance of fuel battery cell 10 can be enhanced. In addition, when the Gurley numbers of low-elasticity parts 5' and 15' and high-elasticity parts 6' and 16' are 150 sec/100 mL or less, the gas permeability and the discharge performance of water of gas diffusion layer 3 can be sufficiently secured. Thus, the battery performance of fuel battery cell 10 can be further enhanced.

The Gurley number is a numerical value measured as follows. When an inner cylinder in which gas is sealed is put into an outer cylinder in which oil is filled, the outer cylinder gradually descends due to the weight of the inner cylinder, and the gas inside the inner cylinder is compressed. At this time, a time required for gas of a constant volume (100 mL) to permeate a test piece set in the outer cylinder is measured, which is defined as the Gurley number.

In anode-side gas diffusion layer 3a and cathode-side gas diffusion layer 3b, it is preferable that low-elasticity parts 5' and 15' have a single layer structure and high-elasticity parts 6' and 16' have double layer structure. As will be described in the manufacturing method to be described later, by laminating and rerolling two rolled sheets obtained by rolling each material of anode-side gas diffusion layer 3a and cathode-side gas diffusion layer 3b, high-elasticity parts 6' and 16' can be formed. That is, by forming high-elasticity parts 6' and 16' in a double layer structure, high-elasticity parts 6' and 16' can be easily formed.

In anode-side gas diffusion layer 3a and cathode-side gas diffusion layer 3b, it is preferable that thicknesses of low-elasticity parts 5' and 15' and high-elasticity parts 6' and 16' (in other words, dimensions in the laminating direction of MEA 20) are different from each other. More specifically, it is more preferable that the thickness of high-elasticity parts 6' and 16' is thinner than that of low-elasticity parts 5' and 15'. By making the thickness of high-elasticity parts 6' and 16' thinner than that of low-elasticity parts 5' and 15', second gas flow path part 6 and fourth gas flow path part 16 are less likely to be closed in particular.

Manufacturing Method of Fuel Battery Cell

Next, a method of manufacturing fuel battery cell 10 of the present disclosure will be described. Here, a method of manufacturing anode-side gas diffusion layer 3a and cathode-side gas diffusion layer 3b will be described with reference to a flowchart in FIG. 5.

Figure 5:
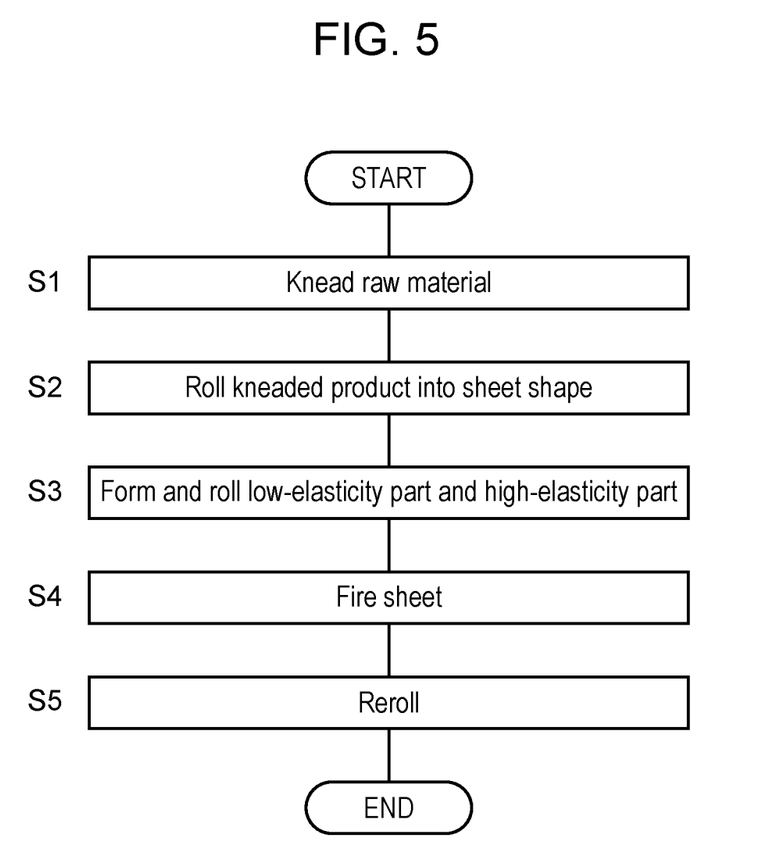
FIG. 5 is a flowchart showing a method of manufacturing the fuel battery cell in FIG. 1.

In Step S1, a raw material of the gas diffusion layer to be manufactured, for example, a carbon material as conductive particles, carbon nanotubes as conductive fibers, a surfactant, and a dispersion solvent are kneaded. After kneading the carbon material, the carbon nanotubes, the surfactant, and the dispersion solvent, PTFE is added as a fluororesin and kneaded again to obtain a kneaded product. When raw materials having different compositions are used for low-elasticity parts 5' and 15' and high-elasticity parts 6' and 16' of the gas diffusion layer to be manufactured, each of the raw materials may be kneaded to prepare a kneaded product.

In the kneading of the raw material of Step S1, for example, a planetary mixer, a rotation/revolution mixer, a kneader, a roller mill, or the like can be used.

In Step S2, the kneaded product obtained in Step S1 is rolled into a sheet shape. In the rolling of Step S2, for example, a rolling machine can be used. The rolling is performed once or multiple times under a condition of rolling at, for example, 0.001 ton/cm to 4 ton/cm, the thickness, the porosity, and the modulus of elasticity of the gas diffusion layer to be manufactured can thus be adjusted. When raw materials having different compositions are used for low-elasticity parts 5' and 15' and high-elasticity parts 6' and 16' of the gas diffusion layer to be manufactured, the prepared kneaded product from the respective raw materials may be rolled to manufacture each of a rolled sheet for forming low-elasticity parts 5' and 15' and a rolled sheet for forming high-elasticity parts 6' and 16'. Further, as described later, when high-elasticity parts 6' and 16' have a double layer structure, a rolled sheet having a shape corresponding to that of the gas diffusion layer to be manufactured and a rolled sheet having a shape corresponding to that of high-elasticity parts 6' and 16' may be manufactured from the same kneaded product.

In Step S3, low-elasticity parts 5' and 15' and high-elasticity parts 6' and 16' are formed and rolled. Hereinafter, three methods for performing Step S3 will be described with reference to FIGS. 5 to 11.

Figure 6:
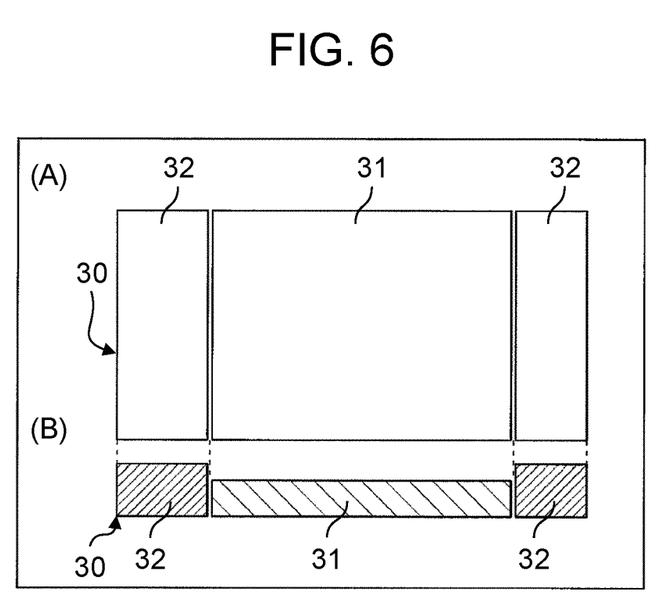
FIG. 6 is a first diagram for explaining Step S3 of the flowchart in FIG. 5.
Figure 7:
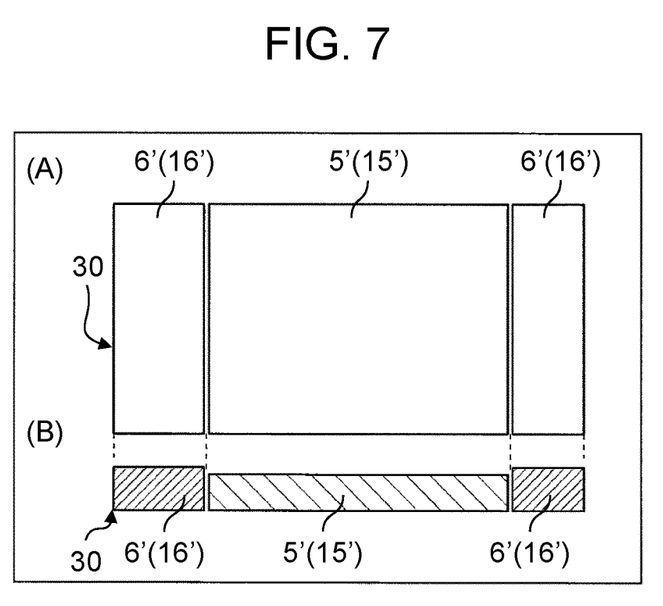
FIG. 7 is a second diagram for explaining Step S3 of the flowchart in FIG. 5.

First, the first method for performing Step S3 of FIG. 5 will be described with reference to FIGS. 6 and 7. FIG. 6A shows a top view of gas diffusion layer 30 produced in Step S2, and FIG. 6B shows a cross-sectional view of gas diffusion layer 30 produced in Step S2. In the method shown in FIGS. 6 and 7, first, raw materials of low-elasticity parts 5' and 15' are kneaded and a kneaded product prepared by kneading is rolled to form first rolled sheet 31 having a shape corresponding to that of low-elasticity parts 5' and 15'. Subsequently, raw materials of high-elasticity parts 6' and 16' having different compositions from the raw materials of low-elasticity parts 5' and 15' are kneaded and a kneaded product prepared by kneading is rolled to form second rolled sheet 32 having a shape corresponding to that of high-elasticity parts 6' and 16'. Thereafter, first rolled sheet 31 is disposed at a position corresponding to that of first gas flow path part 5 and third gas flow path part 15, second rolled sheet 32 is disposed at a position corresponding to that of second gas flow path part 6 and fourth gas flow path part 16, and first rolled sheet 31 and second rolled sheet 32 are rolled. Thus, a rolled sheet having low-elasticity parts 5' and 15' and high-elasticity parts 6' and 16' shown in FIG. 7 is formed.

Figure 8:
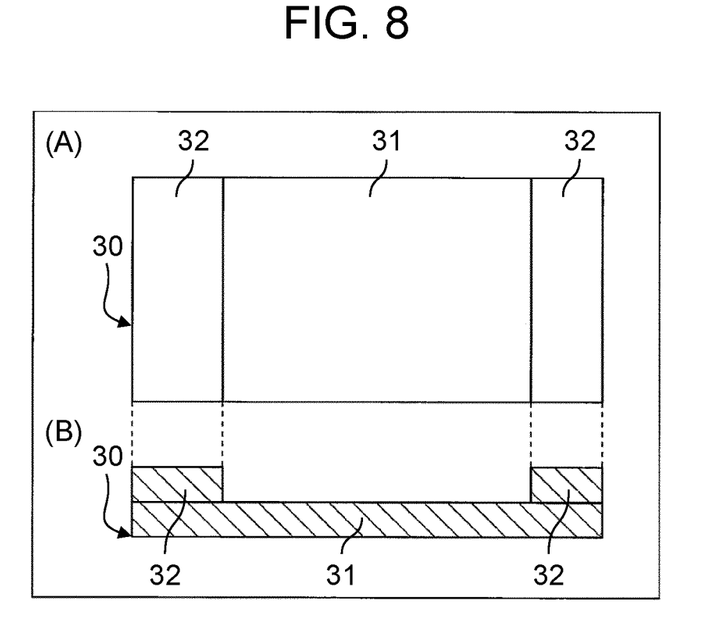
FIG. 8 is a third diagram for explaining Step S3 of the flowchart in FIG. 5.
Figure 9:
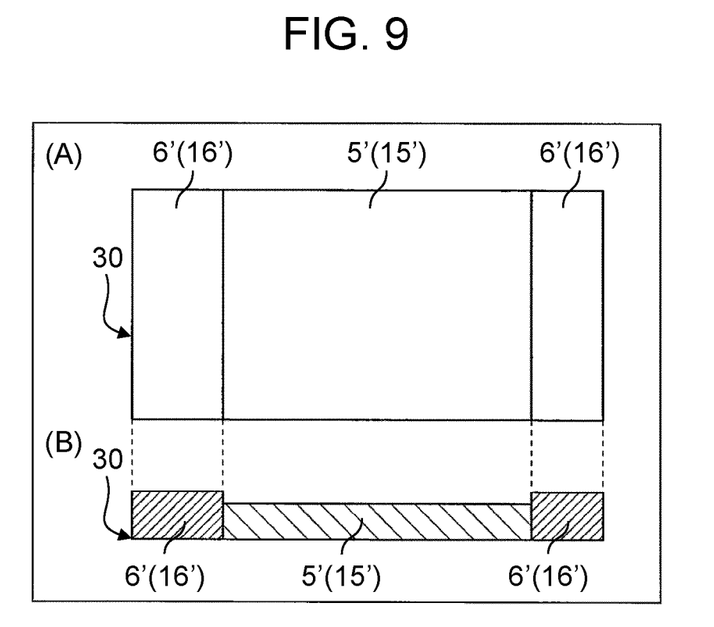
FIG. 9 is a fourth diagram for explaining Step S3 of the flowchart in FIG. 5.

Next, the second method for performing Step S3 of FIG. 5 will be described with reference to FIGS. 8 and 9. FIG. 8A shows a top view of gas diffusion layer 30 produced in Step S2, and FIG. 8B shows a cross-sectional view of gas diffusion layer 30 produced in Step S2. In the method shown in FIGS. 8 and 9, first, a kneaded product prepared by kneading predetermined raw materials (for example, raw materials of low-elasticity parts 5' and 15') is rolled to form first rolled sheet 31 having a shape corresponding to that of the gas diffusion layer to be manufactured. Subsequently, the kneaded product prepared by kneading the same raw material as first rolled sheet 31 is rolled to form second rolled sheet 32 having a shape corresponding to that of high-elasticity parts 6' and 16'. Thereafter, second rolled sheet 32 is disposed to be overlapped with only a portion corresponding to that of second gas flow path part 6 and fourth gas flow path part 16 of first rolled sheet 31, and first rolled sheet 31 and second rolled sheet 32 are rolled. Thus, a rolled sheet having low-elasticity parts 5' and 15' and high-elasticity parts 6' and 16' shown in FIG. 9 is formed.

Figure 10:
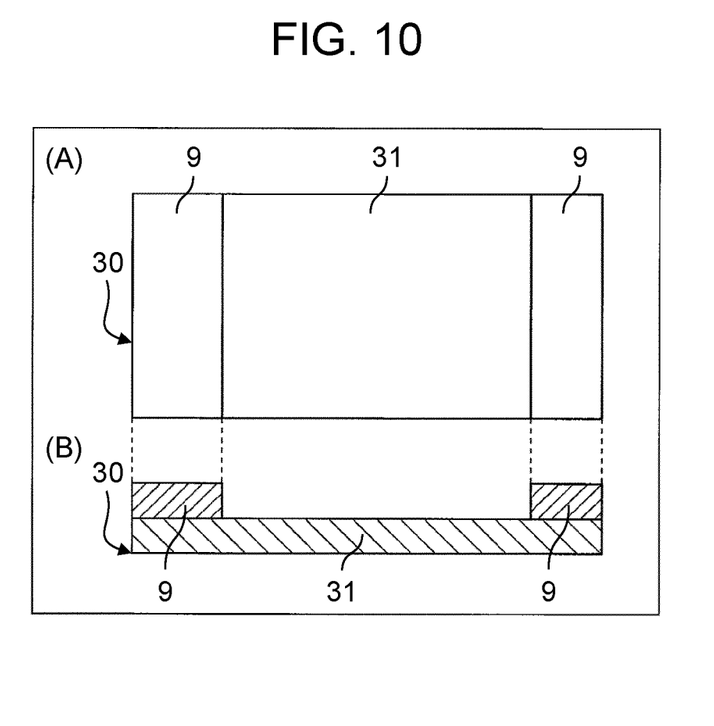
FIG. 10 is a fifth diagram for explaining Step S3 of the flowchart in FIG. 5.
Figure 11:
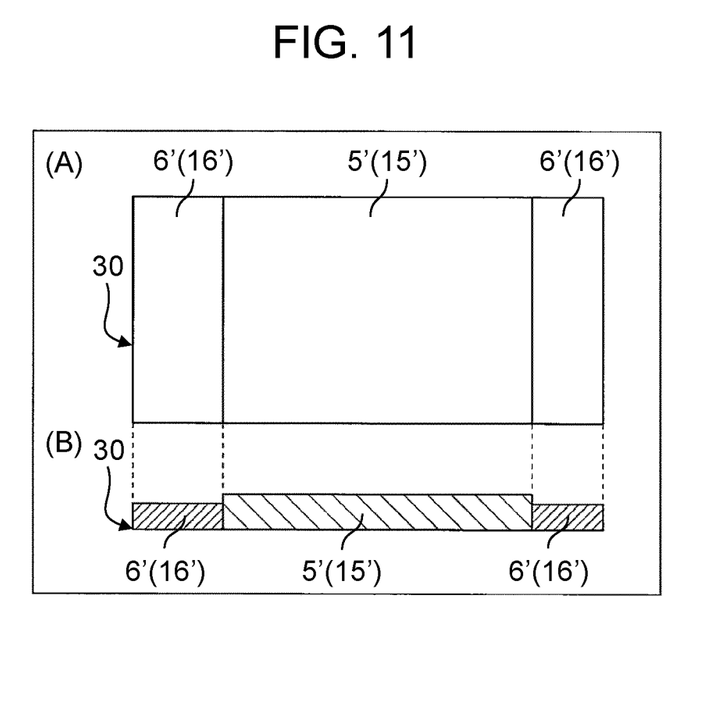
FIG. 11 is a sixth diagram for explaining Step S3 of the flowchart in FIG. 5.

Next, the third method for performing Step S3 of FIG. 5 will be described with reference to FIGS. 10 and 11. FIG. 10A shows a top view of gas diffusion layer 30 produced in Step S2, and FIG. 10B shows a cross-sectional view of gas diffusion layer 30 produced in Step S2. In the method shown in FIGS. 10 and 11, first, a kneaded product prepared by kneading raw materials of low-elasticity parts 5' and 15' is rolled to form first rolled sheet 31 having a shape corresponding to that of the gas diffusion layer to be manufactured. Subsequently, resin sheet 9 is laminated at a portion of first rolled sheet 31 corresponding to that of second gas flow path part 6 and fourth gas flow path part 16, and first rolled sheet 31 and resin sheet 9 are rolled. Thus, a rolled sheet having low-elasticity parts 5' and 15' and high-elasticity parts 6' and 16' shown in FIG. 11 is formed. As a material of resin sheet 9, for example, a Kapton sheet can be used.

In the rolling of Step S3, for example, a roll press machine can be used. The rolling is performed once or multiple times under a condition of roll press at, for example, 0.01 ton/cm to 4 ton/cm, the thickness, the porosity, and the modulus of elasticity of anode-side gas diffusion layer 3a and cathode-side gas diffusion layer 3b can thus be adjusted.

In Step S4, the rolled sheet in Step S3 is fired to remove the surfactant and the dispersion solvent from the rolled sheet.

In the firing of Step S4, for example, an IR furnace or a hot air drying furnace can be used. It is preferable that a firing temperature is set to a temperature higher than a temperature at which the surfactant is decomposed and a temperature lower than a temperature at which the fluororesin melts. The reason for this is as follows. When the firing temperature is set to be higher than the temperature at which the surfactant is decomposed, the surfactant is less likely to stay in anode-side gas diffusion layer 3a and cathode-side gas diffusion layer 3b, such that it is possible to prevent hydrophilization of the inside of anode-side gas diffusion layer 3a and cathode-side gas diffusion layer 3b. As a result, anode-side gas diffusion layer 3a and cathode-side gas diffusion layer 3b where water is less likely to stay can be obtained, and gas permeability of the gas diffusion layer can be improved. In addition, when the firing temperature is set to be lower than the melting point of the fluororesin, the fluororesin in the raw material is less likely to melt, such that it is possible to prevent reduction in strength of anode-side gas diffusion layer 3a and cathode-side gas diffusion layer 3b. Specifically, for example, when PTFE is used as a fluororesin, the firing temperature is preferably 280° C. or higher and 340° C. or lower.

In Step S5, the sheet from which the surfactant and the dispersion solvent have been removed is further rerolled with a roll press machine to adjust a thickness of the gas diffusion layer. Thus, anode-side gas diffusion layer 3a and cathode-side gas diffusion layer 3b can be manufactured.

In the rerolling of Step S5, for example, a roll press machine can be used. The rerolling is performed once or multiple times under a condition of roll press at, for example, 0.01 ton/cm to 4 ton/cm, the thickness, the porosity, and the modulus of elasticity of anode-side gas diffusion layer 3a and cathode-side gas diffusion layer 3b can thus be further adjusted.

MEA 20 obtained by using anode-side gas diffusion layer 3a and cathode-side gas diffusion layer 3b thus obtained is interposed between a pair of separators 4, such that fuel battery cell 10 can be manufactured.

The present disclosure is not limited to the above exemplary embodiment, and can be implemented in various other aspects.

EXAMPLES

Hereinafter, examples of the present disclosure will be described.

Production of Gas Diffusion Layer
Raw Material
Conductive particles: Acetylene black (hereinafter referred to as AB) (produced by Denki Kagaku Kogyo K.K.)
Conductive fiber: VGCF (VGCF-H, produced by SHOWA DENKO K.K.) Fluororesin: PTFE dispersion (produced by DAIKIN INDUSTRIES, Ltd.)

Example 1

A gas diffusion layer was produced as follows using the first method of Step S3 in FIG. 5. Conductive particles and a conductive fiber were dispersed, stirred, and kneaded using the surfactant and water. Thereafter, the fluororesin was added to the mixture, and the mixture was stirred and kneaded again to obtain a kneaded product. Next, the kneaded product was rolled three times using a rolling machine under a condition of rolling at 0.1 ton/cm to obtain a rolled sheet having a porosity of about 71%. Similarly, the kneaded product was rolled four times using a rolling machine under a condition of rolling at 0.1 ton/cm to obtain a rolled sheet having a porosity of about 66%. The rolled sheet having the porosity of about 71% was disposed so as to correspond to first gas flow path part 5, the rolled sheet having the porosity of about 66% was disposed so as to correspond to second gas flow path part 6, and the kneaded product was rolled once using a rolling machine under a condition of rolling at 0.1 ton/cm. The rolled sheet was disposed in an IR furnace and fired at 300° C. for 0.5 hours. The fired sheet was rolled twice using a roll press machine under a condition of rolling at 1 ton/cm to obtain a gas diffusion layer of Example 1.

Example 2

A gas diffusion layer was produced as follows using the second method of Step S3 in FIG. 5. A kneaded product was obtained in the same manner as in Example 1. Next, the kneaded product was rolled three times using a rolling machine under a condition of rolling at 0.1 ton/cm to obtain a rolled sheet having a porosity of about 70%. The rolled sheet having the porosity of about 70% was laminated on the rolled sheet having the porosity of about 70% so as to be formed in two layers at only a portion corresponding to that of second gas flow path part 6. Then, the same steps as in Example 1 were carried out under the same conditions to obtain a gas diffusion layer of Example 2.

Example 3

A gas diffusion layer was produced as follows using the third method of Step S3 in FIG. 5. A kneaded product was obtained in the same manner as in Example 1. Next, the kneaded product was rolled three times using a rolling machine under a condition of rolling at 0.1 ton/cm to obtain a rolled sheet having a porosity of about 72%. Resin sheet 9 (Kapton sheet, thickness: 100 μm, manufactured by DU PONT-TORAY CO., LTD.) at only the portion corresponding to that of second gas flow path part 6 was laminated on the rolled sheet having the porosity of about 72%. Then, the same steps as in Example 1 were carried out under the same conditions to obtain a gas diffusion layer of Example 3.

Comparative Example 1

A kneaded product was obtained in the same manner as in Example 1. Next, the kneaded product was rolled three times using a rolling machine under a condition of rolling at 0.1 ton/cm to obtain a rolled sheet having a porosity of about 73%. The rolled sheet was disposed in an IR furnace and fired at 300° C. for 0.5 hours. The fired sheet was rolled three times using a roll press machine under a condition of rolling at 1 ton/cm to obtain a gas diffusion layer of Comparative Example 1.
Evaluation Test The following evaluation test was carried out for the gas diffusion layers of Examples 1 to 3 and Comparative Example 1. In Examples 1 to 3, the evaluation test was carried out for both low-elasticity part 5' corresponding to first gas flow path part 5 of separator 4 and high-elasticity part 6' corresponding to second gas flow path part 6. The results are shown in FIG. 12.

Compressive Modulus of Elasticity

A compressive modulus of elasticity was measured by the following method. The compressive modulus of elasticity was measured by calculating stress and strain by applying a load up to a surface pressure of 20 kgf/cm$^2$ to a gas diffusion layer having a size of 6.42 cm$^2$, using a tensile and compression testing machine (model: SVZ-200NB, manufactured by IMADA SEISAKUSHO CO., LTD).
Thickness A thickness was measured by the following method. Thicknesses of five portions of the gas diffusion layer having a size of 6.42 cm$^2$ were measured using a Mitutoyo thickness gauge, and an average value thereof is defined as a thickness.
Porosity A porosity was measured by the following method. An apparent true density of the gas diffusion layer was calculated based on a true density and a composition ratio of each material of the gas diffusion layer. Next, a weight, a thickness, and a longitudinal/lateral dimension of the gas diffusion layer were measured to calculate a density of the gas diffusion layer, and a porosity was calculated based on an equation of porosity=(density of gas diffusion layer)/(apparent true density)×100.
Contact Angle A contact angle was measured by the following method. For the contact angle, a static contact angle with respect to pure water was measured using a portable contact angle analyzer (PG-X, manufactured by MATSUBO Corporation).
Gurley Number A Gurley Number was measured by the following method. A device which has an outer cylinder in which oil is filled and an inner cylinder in which gas is sealed, when the inner cylinder was put into the outer cylinder, the inner cylinder gradually descended in the outer cylinder due to the weight, and the gas inside the inner cylinder was compressed, was used. A time required to set the gas diffusion layer having a size of 6.42 cm$^2$ in the outer cylinder of the device and permeate gas of 100 ml to the gas diffusion layer set in the outer cylinder was measured, which was defined as the Gurley Number.

Figure 12:
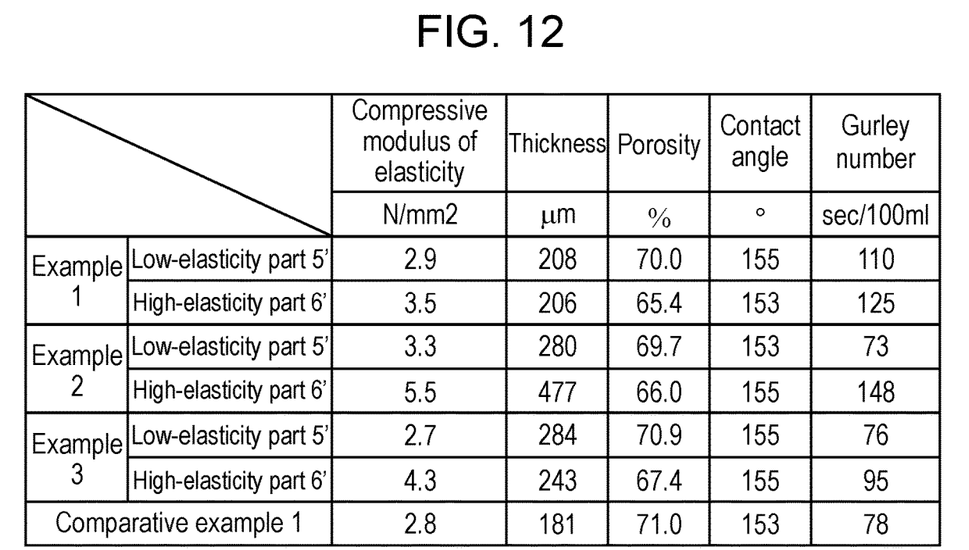
FIG. 12 is a diagram showing results of an evaluation test of a gas diffusion layer.

As shown in FIG. 12, in Examples 1 to 3, the compressive modulus of elasticity of high-elasticity part 6' corresponding to second gas flow path part 6 of separator 4 is larger than that of low-elasticity part 5' corresponding to first gas flow path part 5. However, in Comparative Example 1, the compressive modulus of elasticity of entire gas diffusion layer is constant. In addition, in Examples 1 to 3, the Gurley Number is 150 sec/100 mL or less, and the contact angle is at the same level as that of Comparative Example 1. Therefore, sufficient gas permeability can be secured even in a region having a high compressive modulus of elasticity. As described above, in the gas diffusion layers of Examples 1 to 3, a high-density layer having a low porosity and a high compressive modulus of elasticity is formed in a region corresponding to that of second gas flow path part 6 of separator 4. Therefore, the high-density layer is less likely to be deformed and an enough space in second gas flow path part 6 of separator 4 can be secured, thereby suppressing occurrence of water clogging. Further, even if the high-density layer is formed, sufficient gas permeability of gas diffusion layer 3 itself is secured. That is, according to the present disclosure, fuel battery cell 10 having high power generation performance can be implemented.

The fuel battery cell of the present disclosure can improve the power generation performance of the fuel battery and can implement reduction in manufacturing costs. As a result, the fuel battery cell of the present disclosure is useful for

What is claimed is:

1. A fuel battery cell comprising:
a first separator, a first gas diffusion layer, a first catalyst layer, a polymer electrolyte membrane, a second catalyst layer, a second gas diffusion layer, and a second separator that are sequentially laminated along a laminating direction;
a first gas flow path part that is provided between the first separator and the first gas diffusion layer; and
a second gas flow path part that is provided between the first separator and the first gas diffusion layer and adjacent to the first gas flow path part in a direction intersecting the laminating direction, the second gas flow path part including a flow path area larger than a flow path area of the first gas flow path part in a plan view seen along the laminating direction,
wherein the first gas diffusion layer includes
a first low-elasticity part facing the first gas flow path part, and
a first high-elasticity part facing the second gas flow path part and having a higher compressive modulus of elasticity than a compressive modulus of elasticity of the first low-elasticity part in the laminating direction.

2. The fuel battery cell of claim 1,
wherein the first low-elasticity part has a single layer structure, and the first high-elasticity part has a double layer structure.

3. The fuel battery cell of claim 1,
wherein a thickness of the first low-elasticity part is different from a thickness of the first high-elasticity part.

4. The fuel battery cell of claim 1, further comprising:
a third gas flow path part that is provided between the second separator and the second gas diffusion layer; and
a fourth gas flow path part that is provided between the second separator and the second gas diffusion layer and adjacent to the third gas flow path part in the direction intersecting the laminating direction, and has a flow path area larger than a flow path area of the third gas flow path part in the plan view seen along the laminating direction,
wherein the second gas diffusion layer includes
a second low-elasticity part facing the third gas flow path part, and
a second high-elasticity part facing the fourth gas flow path part and having a higher compressive modulus of elasticity than a compressive modulus of elasticity of the second low-elasticity part in the laminating direction.

5. The fuel battery cell of claim 4,
wherein the second low-elasticity part has a single layer structure, and the second high-elasticity part has a double layer structure.

6. The fuel battery cell of claim 4,
wherein a dimension of the second low-elasticity part in the laminating direction is different from a dimension of the second high-elasticity part in the laminating direction.

7. A fuel battery comprising:
the fuel battery cell of claim 1; and
a pair of current collecting plates disposed on both sides of the fuel battery cell in the laminating direction, respectively.

8. A method of manufacturing the fuel battery cell of claim 1, the method comprising:
rolling a kneaded product prepared by kneading a raw material of the first low-elasticity part to form a first rolled sheet having a shape corresponding to a shape of the first low-elasticity part;
rolling a kneaded product prepared by kneading a raw material of the first high-elasticity part having a different composition from the raw material of the first low-elasticity part to form a second rolled sheet having a shape corresponding to the shape of the first high-elasticity part; and
disposing the first rolled sheet at a position corresponding to a position of the first gas flow path part, and disposing the second rolled sheet at a position corresponding to a position of the second gas flow path part, and then rolling the first rolled sheet and the second rolled sheet to form the first gas diffusion layer.

9. A method of manufacturing the fuel battery cell of claim 1, the method comprising:
rolling a first kneaded product prepared by kneading a raw material to form a first rolled sheet having a shape corresponding to a shape of the first gas diffusion layer;
rolling a second kneaded product prepared by kneading the raw material to form a second rolled sheet having a shape corresponding to that the shape of the first high-elasticity part; and
laminating and rolling the first rolled sheet and the second rolled sheet to form the first gas diffusion layer.

10. A method of manufacturing the fuel battery cell of claim 1, the method comprising:
rolling a kneaded product prepared by kneading a raw material of the first low-elasticity part to form a first rolled sheet having a shape corresponding to a shape of the first low-elasticity part;
rolling a kneaded product prepared by kneading a raw material of the first high-elasticity part to form a second rolled sheet having a shape corresponding to the shape of the first high-elasticity part; and
disposing the first rolled sheet at a position corresponding to a position of the first gas flow path part, and disposing the second rolled sheet at a position corresponding to a position of the second gas flow path part, and then laminating a resin sheet having a shape corresponding to the shape of the first high-elasticity part on the second rolled sheet, and rolling the first rolled sheet, the second rolled sheet, and the resin sheet, to form the first gas diffusion layer.

* * * * *